United States Patent
Van Buskirk, II et al.

(10) Patent No.: US 8,515,813 B2
(45) Date of Patent: Aug. 20, 2013

(54) VIRTUAL-WORLD AVATAR-BASED ADVERTISING WITH GESTURES AND PREDETERMINED PAYMENTS

(75) Inventors: Ronald E. Van Buskirk, II, Boulder, CO (US); David L. Wright, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/787,087

(22) Filed: May 25, 2010

(65) Prior Publication Data
US 2011/0295698 A1  Dec. 1, 2011

(51) Int. Cl.
*G06Q 30/00* (2012.01)
(52) U.S. Cl.
USPC .................................................... 705/14.69
(58) Field of Classification Search
USPC ............................................................. 705/14
See application file for complete search history.

(56) References Cited

U.S. PATENT DOCUMENTS

| | | | |
|---|---|---|---|
| 6,229,533 B1 * | 5/2001 | Farmer et al. | 345/473 |
| 7,783,646 B2 * | 8/2010 | Hamilton et al. | 707/751 |
| 7,797,168 B2 * | 9/2010 | Kusumoto et al. | 705/1.1 |
| 7,996,264 B2 * | 8/2011 | Kusumoto et al. | 705/14.16 |
| 8,099,316 B2 * | 1/2012 | Moukas et al. | 705/7.29 |
| 8,128,487 B2 * | 3/2012 | Hamilton et al. | 463/25 |
| 2008/0161113 A1 | 7/2008 | Hansen et al. | |
| 2008/0204450 A1 | 8/2008 | Dawson et al. | |
| 2008/0262910 A1 * | 10/2008 | Altberg et al. | 705/14 |
| 2008/0282305 A1 | 11/2008 | Uhrig et al. | |
| 2009/0048918 A1 | 2/2009 | Dawson et al. | |
| 2009/0055249 A1 | 2/2009 | Lieberman | |
| 2009/0094517 A1 | 4/2009 | Brody et al. | |
| 2009/0112718 A1 | 4/2009 | Steelberg et al. | |
| 2009/0144105 A1 * | 6/2009 | Blatchley et al. | 705/7 |

* cited by examiner

*Primary Examiner* — John G Weiss
*Assistant Examiner* — Christopher Stroud
(74) *Attorney, Agent, or Firm* — Yudell Isidore Ng Russell PLLC

(57) ABSTRACT

A technique for advertising in a virtual-world includes installing an advertising gesture in an inventory of a user that has an associated avatar. The user is credited with a predetermined payment when the associated avatar performs the advertising gesture and the associated avatar is viewable on-screen when the advertising gesture is performed.

15 Claims, 4 Drawing Sheets

VIRTUAL-WORLD AVATAR-BASED ADVERTISING WITH GESTURES AND PREDETERMINED PAYMENTS

BACKGROUND

This disclosure relates generally to virtual-world advertising and, more specifically, to virtual-world avatar-based advertising with gestures and predetermined payments.

A web browser (hereinafter "browser") is a software application that allows a user at a client computer system (hereinafter "client") to display and interact with text, images, and other information located on a web page at a website (hosted by an application server) on the World Wide Web or a local area network. Text and images on a web page may contain hyperlinks to other web pages at the same or different website. Browsers allow a user to quickly and easily access information provided on web pages at various websites by traversing hyperlinks. Browsers usually format hypertext markup language (HTML) information for display and, as such, an appearance of a web page may differ between browsers. A number of different browsers, e.g., Internet Explorer™, Mozilla Firefox™, Safari™, Opera™, and Netscape™, are currently available for personal computers. In general, browsers are the most commonly used type of hypertext transfer protocol (HTTP) user agent. While browsers are typically used to access web application servers (hereinafter "web servers") that are part of the World Wide Web, browsers can also be used to access information provided by web servers in private networks or content in file systems.

For example, a browser may be utilized by a user to interact with a virtual-world (VW) provided by a VW application server. A VW is a computer-based simulated environment that various users may inhabit and interact with each other via avatars, which are usually depicted as two-dimensional (2D) or three-dimensional (3D) graphical representations (e.g., graphical representations of humans or animals). In a typical VW, perceptual stimuli is provided (via a browser) to a user, who can manipulate (via the browser) elements of the VW and, in this manner, experience a virtual presence to some degree. The VW may simulate rules based on the real-world (RW) or some fantasy world. For example, rules associated with gravity, topography, locomotion, real-time actions, and communication may be implemented. Communication between users may range from text, graphical icons, visual gesture, sound, and occasionally forms using touch and balance senses. For example, real-time voice communication using voice over Internet protocol (VoIP) may be implemented. In general, VWs may encompass a wide variety of applications, e.g., games, computer conferencing, and text based chat-rooms.

One study of VW users concluded that when an avatar performs a behavior, a user associated with the avatar is more likely to perform the behavior in the RW. In this VW study, a user did not have control over an associated avatar. That is, a VW researcher controlled an avatar of a user and then studied the behavior of the user in the RW. As one example, according to the study, when a user viewed an associated avatar jogging in a VW, the user was more likely to jog in the RW.

A number of companies have established a VW presence in order to advertise goods and/or services. For example, companies have provided VW advertisements in the form of billboards and posters, either of which may include hyperlinks and/or menus to facilitate the performance of different actions. As another example, at least one company has provided VW advertisements in the form of a kiosk, which may be configured to teleport an avatar of a user to a different location (e.g., an in-world store of a VW advertiser). As yet another example, at least one company has implemented VW advertisements in the form of an avatar that moves around in a VW to advertise a product (e.g., an avatar that resembles a Nestle' bunny that hops around a VW to advertise Nesquik® products).

SUMMARY

According to one aspect of the present disclosure, a technique for advertising in a virtual-world includes installing an advertising gesture in an inventory of a user that has an associated avatar. The user is then credited with a predetermined payment when the associated avatar performs the advertising gesture and the associated avatar is viewable on-screen when the advertising gesture is performed.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
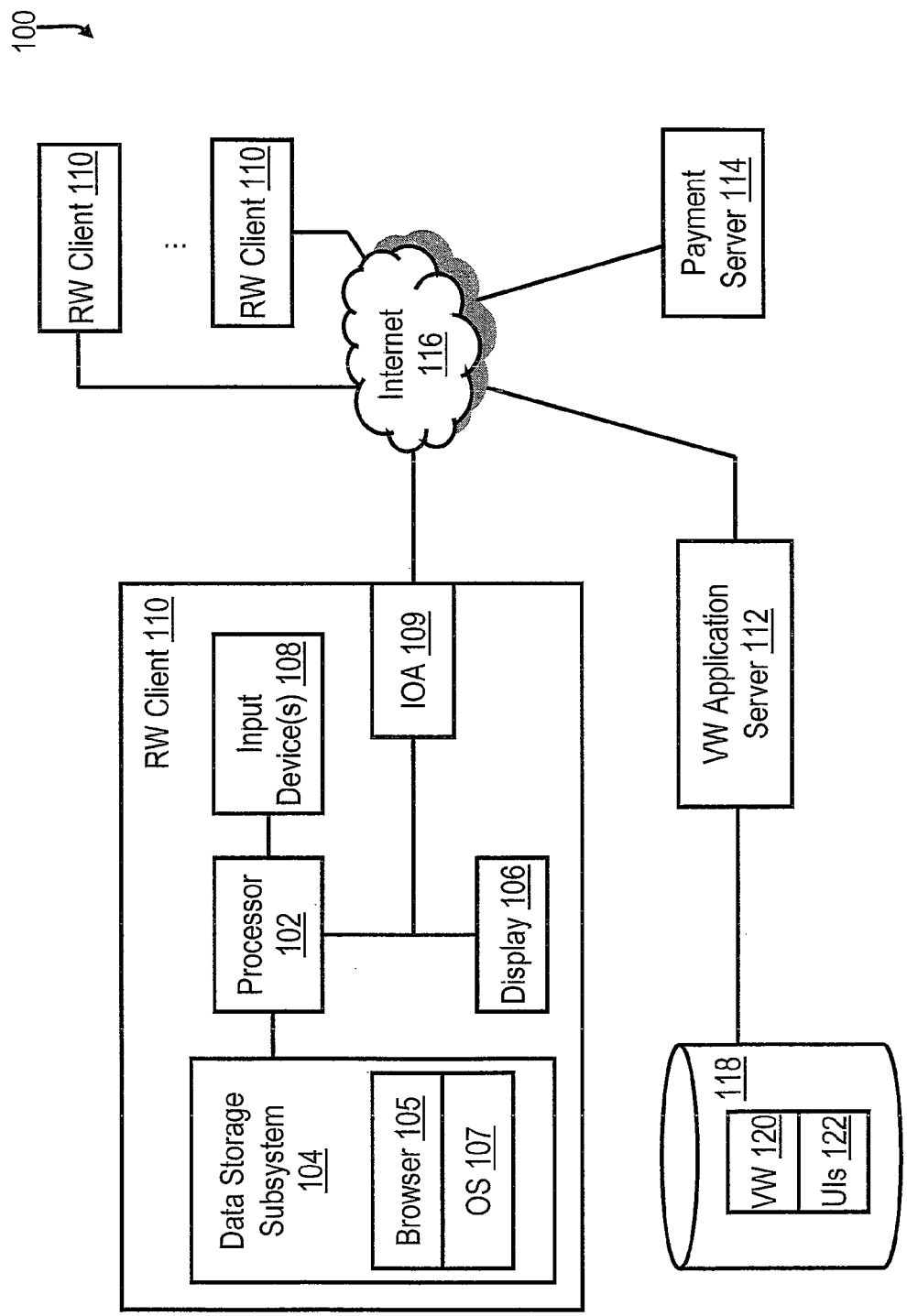
FIG. 1 is a block diagram of an example data processing system that may be configured to implement virtual-world (VW) avatar-based advertising with gestures and predetermined payments according to various aspects of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

In 2007 approximately 279 billion dollars were spent in the United States on advertising. In general, companies are willing to spend money on advertising because companies believe advertising is an effective tool to sell goods/services. With a relatively large amount of advertising dollars available, advertising agencies are usually looking for fresh and creative advertising approaches. The more effective the advertising approach, the more valuable the advertising approach is to a company. In general, a virtual-world (VW), such as Second Life™, attempts to attract companies to create a virtual presence within the VW in order to generate revenue for the companies via, for example, sales attributable to advertising of goods/services in the VW. Currently, a company can advertise in a VW via: billboards; posters; kiosks; creating a virtual presence for physical resources; utilizing hyperlinks to websites from scripts; using avatar advertising; and in-world media advertising. One disadvantage of current VW advertising approaches is that the current VW advertising approaches are exploited by many advertisers and, as such, any given advertisement may be ineffective in reaching a VW user. Another disadvantage of current VW advertising approaches is that most are passive and have to be noticed by a VW user to be effective.

According to the present disclosure, VW advertisement is primarily based on the belief that a user of a VW is more likely to use a good/service in the RW if the user observes an associated avatar using the good/service in the VW. VW advertisement is secondarily based on the belief that other users of the VW are more likely to use the good/service in the RW if the other users observe an attractive avatar using the good/service in the VW.

The present disclosure leverages VW research findings to create an effective advertising channel. According to one aspect of the present disclosure, a VW user is allowed to sign-up for an advertising service in which the user receives a predetermined payment each time the user views themselves performing an advertising gesture an advertiser wishes to promote. For example, if a beverage company wanted a VW user to buy more of their beverages in the RW, the beverage company could make a predetermined payment (e.g., $L5) to the user each time an avatar associated with the user drank a virtual beverage in the VW. One advantage of the disclosed advertising techniques is that the disclosed advertising techniques are distinct from known advertising techniques to which audiences have generally become immune. Another advantage of the disclosed advertising techniques is that the disclosed advertising techniques are active and are implemented on a personal level, as a VW user has to activate an advertising gesture to receive a payment. Yet another advantage of the disclosed advertising techniques is that the disclosed advertising techniques work subliminally, as VW users are not generally aware of the effect the advertising techniques have on them.

According to one aspect of the present disclosure, the disclosed advertising techniques may be initiated when an avatar walks into an in-world store and attempts to sign-up for an advertising service. In one or more embodiments, when an appearance of the avatar is acceptable to an advertiser, an appropriate advertising gesture may be installed in an inventory of a user associated with the avatar. When the main focus of the advertisement is to persuade the user (associated with the avatar) to buy a good/service in the RW, an appearance of the avatar is not particularly important and a determination of whether an appearance of the avatar is acceptable may be omitted.

According to various embodiments, when a VW user performs an advertising gesture, a script may be employed to ensure the avatar of the user is viewable on-screen (e.g. to the user and/or to other users) and that the avatar has not been modified in a manner that is not acceptable to an advertiser. For example, if an avatar has changed from human form to a purple dinosaur, an advertiser may not want a purple dinosaur advertising a good/service of the advertiser. As another example, if an avatar has acquired facial hair, an advertiser may not mind and still want the avatar to advertise a good/service of the advertiser. If the avatar is viewable on-screen when the advertising gesture is performed and the avatar has not been modified in a manner unacceptable to the advertiser, a script may be employed to credit the user with a predetermined amount of VW cash or RW cash.

With reference to FIG. 1, an example data processing system 100 is illustrated that includes a real-world (RW) client 110 (which may be, for example, a workstation, a laptop computer system, a notebook computer system, or a desktop computer system that is executing a browser) that is coupled (via, for example, an Internet connection and one or more Internet service providers (ISPs)) to a virtual-world (VW) application server 112. The client 110 includes a processor 102 (which may include one or more processor cores) that is coupled to a memory subsystem 104, a display 106, and an input device 108. The memory subsystem 104 includes an application appropriate amount of volatile memory (e.g., dynamic random access memory (DRAM)) and non-volatile memory (e.g., read-only memory (ROM)). The display 106 may be, for example, a cathode ray tube (CRT) or a liquid crystal display (LCD). The input device 108 may include, for example, a mouse and a keyboard. The processor 102 may also be coupled to one or more mass storage devices, e.g., a compact disc read-only memory (CD-ROM) drive. It should be appreciated that a VW user utilizes a browser of the RW client 110 to interact with an associated avatar in a VW provided by a VW application executing on the VW application server 112, which may be configured in a similar manner as the RW client 110.

Figure 2:
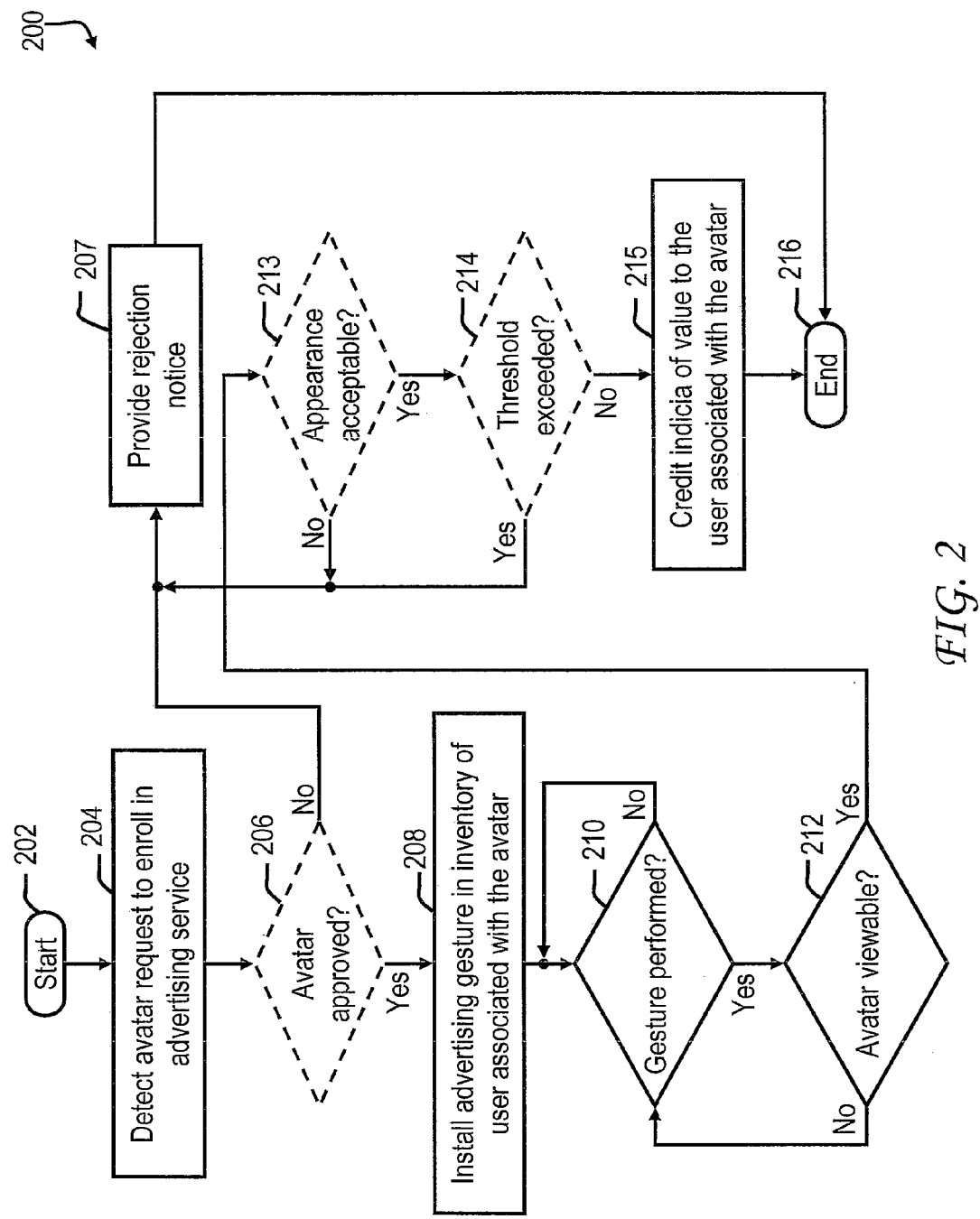
FIG. 2 is a flow chart of a process for implementing VW avatar-based advertising with gestures and predetermined payments according to various aspects of the present disclosure.

With reference to FIG. 2, an example process 200 is illustrated that implements VW avatar-based advertising with gestures and predetermined payments (e.g., micro-payments) according to various aspects of the present disclosure. It should be appreciated that portions of the process 200 may execute on the RW client 110 and other portions of the process 200 may execute on the VW application server 112. The process 200 is initiated in block 202 at which point control transfers to block 204, where a user (via an associated avatar) attempts to sign-up for an advertising service in response to a communication (e.g., a sign) that alerts the user that an advertiser is seeking avatars to advertise a good/service. For example, a user may choose to sign-up with an advertising agency (or other company representative) to advertise clothing or a beverage.

Next, in decision block 206, an advertising agent (e.g., an employee of the advertising agency) determines whether to approve the avatar for the advertising service. For example, an advertiser may evaluate the associated avatar (via, for example, an advertiser agent user, which may work for a company whose good/service is advertised or for an advertising agency hired by the company) to determine if the associated avatar is an acceptable advertising candidate (for example, when other VW users are the main focus of the advertiser). Alternatively, an image analysis program may be employed to determine whether the avatar is acceptable. As another alternative, an evaluation program or an advertising agent may examine parameters of an avatar to ensure the parameters are within certain thresholds (e.g., an advertising agent for a bridal gown store may check to ensure the avatar is female).

Assuming an appearance of the avatar is acceptable (or if approval of the appearance of the avatar is not required, for example, when the user is the main focus of the advertiser), the advertiser agent user initiates installation of a gesture (e.g., a 'drinking beverage' gesture) in an inventory (which may be stored on a VW application server or a client) of the user in block 208. The advertiser may also initiate execution of a script that records a profile of the user's avatar (at that point in time) and registers the profile with the advertising gesture (to facilitate determination of whether the avatar has been modified at a later point in time). When the appearance of the avatar is not acceptable in block 206, control transfers to block 207 where a rejection notice is provided to the user and then to block 216, where the process 200 terminates.

Following installation of the advertising gesture in block 208, control transfers to decision block 210 where the process 200 determines whether an advertising gesture has been performed by an avatar. Next, in block 212, the process 200 determines whether the avatar is viewable on-screen (to an associated user and/or to other users not associated with the avatar) and whether an appearance of the avatar is acceptable to an advertiser in optional block 213 (if desired). For example, when an avatar performs an advertising gesture, a script may be employed to verify the avatar is viewable on-screen and has not changed in an unacceptable manner (by comparing a profile of a registered avatar with a profile of the avatar that performed the advertising gesture). When the avatar is not viewable on-screen (to a desired audience) in block 212, control transfers to block 210 (where the process 200 waits for the gesture to be performed again). When the avatar is viewable on-screen to a desired audience in block 212, control transfers to block 215. In block 215, the process 200 credits the user (associated with the avatar) with a predetermined payment (e.g., VW cash or RW cash) and then control transfers to block 216, where the process 200 terminates. Following block 212, control may optionally transfer to block 216 via optional block 213 (where a determination is made as to whether an appearance of the avatar is acceptable to an advertising agent) and optional block 214 (where a determination is made as to whether a threshold has been exceeded).

Figure 3:
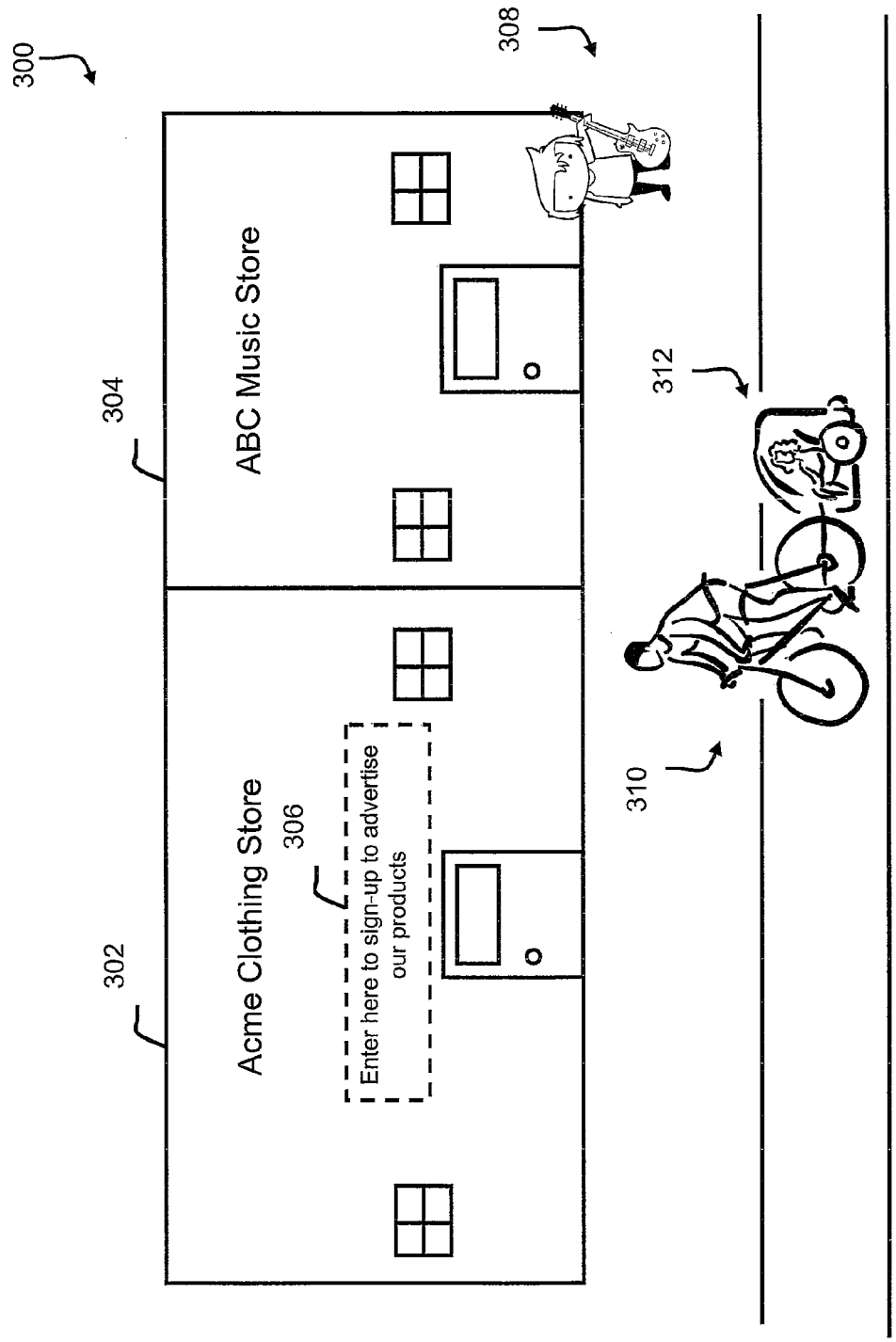
FIG. 3 is a view of a relevant portion of an example VW city scene according to various aspects of the present disclosure.

With reference to FIG. 3, a relevant portion of an example VW city scene 300 that may be presented by VW application 120 is depicted. VW city scene 300 includes two stores 302 and 304 (respectively, labeled "Acme Clothing Store" and "ABC Music Store"), a sign 306, and exemplary avatars 308, 310, and 312. Sign 306 bears a message (which reads "Enter here to sign-up to advertise our products") that is provided to entice avatars that pass by store 302 (and the associated users) to enter store 302 and enroll in an advertising service.

Figure 4:
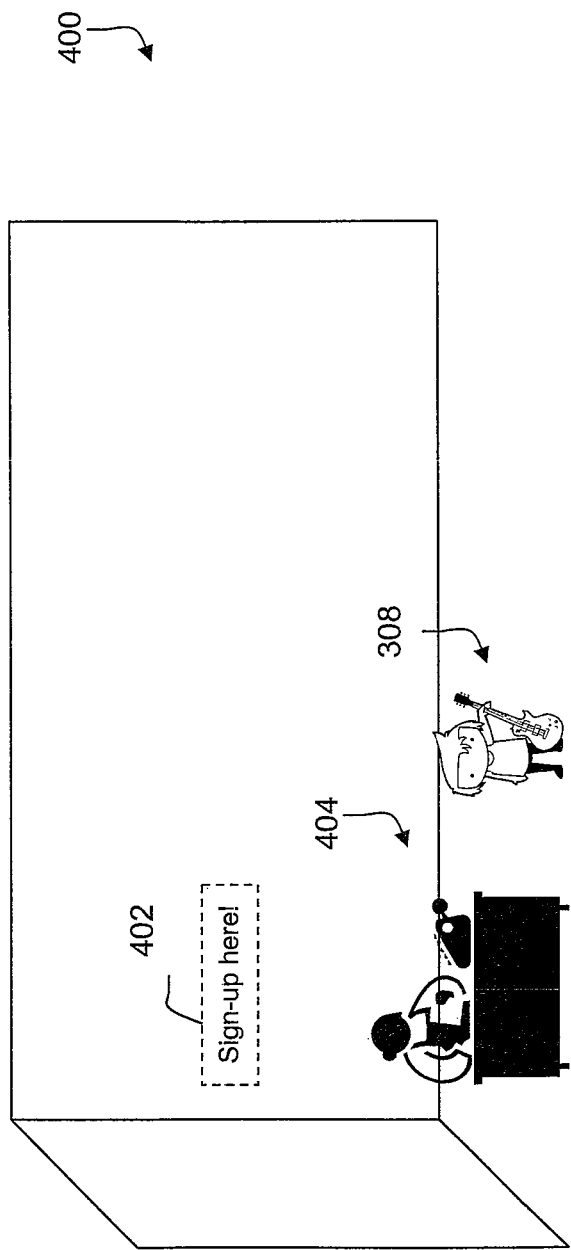
FIG. 4 is a view of a relevant portion of an interior of an example store in the VW city scene of FIG. 3.

With reference to FIG. 4, a VW store scene 400 depicts avatar 308 as having entered store 302 and approached an avatar 404 associated with an advertising service, based on a sign 402 (which reads "Sign-up here"), to enroll in an advertising service associated with the store 302. It should be appreciated that an avatar may utilize other techniques to sign-up for an advertising service (e.g., selection of a hyperlink).

In the present example, the advertising gesture required to qualify to obtain the indicia of value may be, for example, avatar 308 wearing clothing from Acme clothing store 302, avatar 308 wearing clothing bearing an indicia of Acme clothing store 302, avatar 308 reentering Acme clothing store 302, or avatar 308 reentering Acme clothing store 302 when such re-entry is visible to users associated with one or more other avatars 310, 312.

Accordingly, a number of techniques have been disclosed herein that generally increase the effectiveness of VW advertising on RW behavior of a VW user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of advertising in a virtual-world, comprising:
   authorizing, using a data processing system, a user to install an advertising gesture in an inventory of the user only when an advertising agent approves an associated avatar of the user to advertise a good or service represented by the advertising gesture;
   installing, using the data processing system, the advertising gesture in the inventory of the user subsequent to the user being authorized to install the advertising gesture in the inventory of the user,
   crediting, using the data processing system, the user with a predetermined payment when the associated avatar performs the advertising gesture and the associated avatar is viewable on-screen when the advertising gesture is performed;
   determining, using the data processing system, whether an appearance of a different avatar whose appearance deviates from the associated avatar is acceptable to an advertiser associated with the advertising gesture following performance of the advertising gesture by the different avatar, wherein the different avatar corresponds to a modified version of the associated avatar; and
   crediting, using the data processing system, the user with the predetermined payment only when the different avatar performs the advertising gesture, the different avatar is acceptable to the advertiser, and the different avatar is viewable on-screen when the advertising gesture is performed.

2. The method of claim 1, further comprising:
   determining, using the data processing system, whether the associated avatar performed the advertising gesture; and
   determining, using the data processing system, whether the associated avatar is viewable on-screen when the advertising gesture is performed by the associated avatar.

3. The method of claim 1, wherein the installing further comprises:
   installing the advertising gesture in the inventory of the user in response to the associated avatar entering an in-world store and requesting to sign-up for an advertising service.

4. The method of claim 1, wherein the predetermined payment corresponds to a fixed amount of virtual-world cash or real-world cash.

5. The method of claim 1, wherein the associated avatar is viewable on-screen only to the user.

6. The method of claim 1, wherein the associated avatar is viewable on-screen to the user and other users.

7. A data processing system that facilitates advertising in a virtual-world, comprising:
   a memory subsystem; and
   one or more processors coupled to the memory subsystem, wherein the one or more processors are configured to:
      authorize a user to install an advertising gesture in an inventory of the user only when an advertising agent approves an associated avatar of the user to advertise a good or service represented by the advertising gesture;
      install the advertising gesture in the inventory of the user subsequent to the user being authorized to install the advertising gesture in the inventory of the user;
      credit the user with a predetermined payment when the associated avatar performs the advertising gesture and the associated avatar is viewable on-screen when the advertising gesture is performed;
      determine whether an appearance of a different avatar whose appearance deviates from the associated avatar is acceptable to an advertiser associated with the advertising gesture following performance of the advertising gesture by the different avatar, wherein the different avatar corresponds to a modified version of the associated avatar; and
      credit the user with the predetermined payment only when the different avatar performs the advertising gesture, the different avatar is acceptable to the advertiser, and the different avatar is viewable on-screen when the advertising gesture is performed.

8. The data processing system of claim 7, wherein the one or more processors are further configured to:
   determine whether the associated avatar performed the advertising gesture;
   determine whether the associated avatar is viewable on-screen when the advertising gesture is performed by the associated avatar.

9. The data processing system of claim 7, wherein the one or more processors are further configured to:
   install the advertising gesture in the inventory of the user in response to the associated avatar entering an in-world store and requesting to sign-up for an advertising service.

10. The data processing system of claim 7, wherein the predetermined payment corresponds to a fixed amount of virtual-world cash or real-world cash.

11. The data processing system of claim 7, wherein the associated avatar is viewable on-screen only to the user.

12. The data processing system of claim 7, wherein the associated avatar is viewable on-screen to the user and other users.

13. A computer program product for facilitating advertising in a virtual-world, the computer program product comprising:
   a tangible computer readable storage medium having computer readable program code embodied therewith, wherein the computer readable program code when executed by a data processing system causes the data processing system to:
      determine whether an advertising agent approves an appearance of an associated avatar of a user to advertise a good or service represented by an advertising gesture;
      install the advertising gesture in an inventory of the user subsequent to approval of the associated avatar by the advertising agent;
      credit the user with a predetermined payment when the associated avatar performs the advertising gesture and the associated avatar is viewable on-screen when the advertising gesture is performed;
      determine whether an appearance of a different avatar whose appearance deviates from the associated avatar is acceptable to an advertiser associated with the advertising gesture following performance of the advertising gesture by the different avatar, wherein the different avatar corresponds to a modified version of the associated avatar; and
      credit the user with the predetermined payment only when the different avatar performs the advertising gesture, the different avatar is acceptable to the advertiser, and the different avatar is viewable on-screen when the advertising gesture is performed.

14. The computer program product of claim 13, where the code further comprises code that, when executed by the data processing system, causes the data processing system to:
   determine whether the associated avatar performed the advertising gesture;
   determine whether the associated avatar is viewable on-screen when the advertising gesture is performed by the associated avatar.

15. The computer program product of claim 13, wherein the predetermined payment corresponds to a fixed amount of virtual-world cash or real-world cash and the associated avatar is viewable on-screen only to the user.

* * * * *